United States Patent
Kim

(10) Patent No.: US 8,189,988 B2
(45) Date of Patent: May 29, 2012

(54) DIGITAL VIDEO RECORDER HAVING HIERARCHICAL MEMORIES AND METHOD FOR IMPLEMENTING HIERARCHICAL MEMORIES

(75) Inventor: Tae-Gyu Kim, Seognam-si (KR)

(73) Assignee: Humax Co., Ltd., Gyeonggi-Do (KR)

( * ) Notice: Subject to any disclaimer, the term of this patent is extended or adjusted under 35 U.S.C. 154(b) by 1299 days.

(21) Appl. No.: 11/835,816

(22) Filed: Aug. 8, 2007

(65) Prior Publication Data

US 2008/0040537 A1 Feb. 14, 2008

(30) Foreign Application Priority Data

Aug. 9, 2006 (KR) ........................ 10-2006-0075348

(51) Int. Cl.
| | |
|---|---|
| *H04N 5/935* | (2006.01) |
| *H04N 5/84* | (2006.01) |
| *H04N 5/92* | (2006.01) |
| *H04N 5/93* | (2006.01) |
| *H04N 5/783* | (2006.01) |
| *H04N 9/80* | (2006.01) |
| *G06F 13/00* | (2006.01) |

(52) U.S. Cl. ........ 386/213; 386/241; 386/279; 386/326; 386/334; 386/344; 711/112; 711/117

(58) Field of Classification Search ................... 386/213, 386/241, 279, 326, 334, 344, E9.013; 711/112, 711/117, E12.001, E12.016, E12.019
See application file for complete search history.

(56) References Cited

U.S. PATENT DOCUMENTS

| 2004/0202073 A1 | 10/2004 | Lai et al. ..................... 369/47.33 |
| 2006/0051060 A1* | 3/2006 | Dorovanessian et al. ....... 386/94 |
| 2007/0223875 A1* | 9/2007 | Chung et al. .................... 386/95 |

FOREIGN PATENT DOCUMENTS

EP 1 605 453 A2 12/2005

OTHER PUBLICATIONS

Hu, Yet al.; "A New Hierarchical Disk Architecture"; IEEE Micro, IEEE Service Center, Los Alamitos, CA, vol. 18, No. 6, Nov. 1998, pp. 64-76 (XP-000805934).
European Office Action dated May 28, 2009.

* cited by examiner

*Primary Examiner* — Thai Tran
*Assistant Examiner* — Syed Hasan
(74) *Attorney, Agent, or Firm* — KED & Associates, LLP

(57) ABSTRACT

A digital video recorder having hierarchical memories and a method for implementing the hierarchical memories are disclosed. The digital video recorder in accordance with an embodiment of the present invention includes i) a storage unit, which includes a volatile memory, a non-volatile memory, and a hard disk drive and ii) a memory controller, which controls audio and video streams successively outputted from a demultiplexer to be moved to and stored in the volatile memory, the non-volatile memory, and the hard disk drive in the order of the volatile memory, non-volatile memory, and hard disk drive.

17 Claims, 5 Drawing Sheets

DIGITAL VIDEO RECORDER HAVING HIERARCHICAL MEMORIES AND METHOD FOR IMPLEMENTING HIERARCHICAL MEMORIES

CROSS-REFERENCE TO RELATED PATENT APPLICATIONS

This application claims the benefit of Korean Patent Application No. 10-2006-0075348, filed on Aug. 9, 2006, in the Korean Intellectual Property Office, the disclosure of which is incorporated herein in its entirety by reference.

BACKGROUND OF THE INVENTION

1. Field of the Invention

The present invention relates to a digital video recorder. More specifically, the present invention relates to a digital video recorder having hierarchical memories for efficient video recording and playing back and a method for implementing hierarchical memories.

2. Description of the Related Technology

Started in the computer industry, digitalization of information has already reached its application in the telecommunications industry. Today, television broadcast signals are even digitalized. It is certain that the digitalization of television broadcast signals will open a new paradigm of two-way multimedia experience that is integrated with computer and telecommunications technologies.

Digital broadcasting is progressing around the European standard of DVD (Digital Video Broadcasting) and the American FCC standard of ATV (Advanced TV), which is in compliance with the ATSC standard, which the U.S. adopted as the next-generation TV standard to replace the conventional analog standard of NTSC.

Unlike the conventional storage of analog signals in a cassette tape, a PVR (Personal Video Recorder) receives signals, transmitted from a broadcast station or outputted from a television, converts the signals to digital information in real time, compresses the digital data into an MPEG2 file, and stores the data in a pre-installed hard disk (HD). The PVR then reads the stored data and outputs images, which are decoded in real time, to a display device.

FIG. 1 is a block diagram showing the structure of a conventional PVR system.

Referring to FIG. 1, the PVR system includes an IR receiver 110, a processor 120, a memory 130, a tuner 140, a demultiplexer 150, a decoder 160, an output unit 170, an OSD unit 180, an IDE interface 185, and a hard disk drive 190.

The IR receiver 110 receives remote control code information corresponding to a remote control operated by a user and transmits the remote control code information to the processor 120.

The processor 120 translates a remote control code received from the IR receiver 110 and transmits remote control code translation information to a corresponding device. For example, if the remote control code translation information is a command to request a channel change, the processor 120 transmits the command to the tuner 140. Likewise, if the remote control code translation information is a command to record a program, the received broadcast data is controlled to be stored in the hard disk drive 190. If the remote control code translation information is a command to request a recording list, the recording list stored in the hard disk drive 190 is outputted through the output unit 170.

The memory 130 can include a flash ROM, in which software for the operation of the PVR system is stored, and a DRAM, which stores a bitmap-type virtual screen that can be displayed through the output unit 170.

The tuner 140 receives and outputs the broadcast signals, which are selected by the control of the processor 120.

The demultiplexer 150 parses various kinds of information, such as audio, video, and other data, which are multiplexed in the broadcast signals supplied from the tuner 140.

The decoder 160 decodes audio signals, video signals, and data signals, parsed by the demultiplexer 150, and processes these signals to visual and audio information that can be outputted through the output unit 170 such that the user can recognize these signals.

The OSD unit 180 displays information corresponding to a particular command given by the processor 120. For instance, if a recording list output command is received from the processor 120, the OSD unit 180 controls the recording list extracted from the hard disk drive 190 to be displayed through the output unit 170.

The IDE interface 185 receives transport packet (TP) data, transmitted from the demultiplexer 150 for recording, and provides the TD data to the hard disk drive 190. If a playback command is received from the processor 120, the IDE interface 185 transmits the data stored in the hard disk drive 190 to the decoder 160 through the processor 120.

The hard disk drive 190 stores the TP data, transmitted from the IDE interface 185, that is, programs selected by the user through the recording command are stored in the hard disk drive 190.

It is natural that multimedia data usually have a large amount of data flow. Digital recording devices, such as the PVR, are equipped with a large capacity hard disk drive to store this large amount of data flow.

While the hard disk drive is capable of storing a large amount of data at a low cost, the hard disk drive also has its own shortcomings over the flash memories, namely, slow access speeds, slow operation speeds, low durability, and short life. The durability and life of a hard disk drive can be an important factor that determines the durability and life of a digital recording device.

As an attempt to address the above problems, the conventional digital recording device with a hard disk drive switches the hard disk drive to a stand-by mode or utilizes a large-capacity memory while the recording feature is not used. However, since most features of the digital recording device, for example, time-shift recording that can pause a live program, are based on the operation of the hard disk drive, the duration of maintaining the hard disk drive in a stand-by mode is very limited. Equipping the digital recording device with a large-capacity memory costs a lot more than the hard disk drive. Being inevitably a machine device, the hard disk drive generates a great deal of noise and heat, which can be inappropriate for an appliance.

SUMMARY OF CERTAIN INVENTIVE ASPECTS

One aspect of the present invention provides a digital video recorder having hierarchical memories and a method for implementing the hierarchical memories that can minimize the use of a hard disk drive by hierarchically utilizing storage means in accordance with characteristics of data.

Another aspect of the present invention provides a digital video recorder having hierarchical memories and a method for implementing the hierarchical memories that can use data at a higher speed and minimize the use of a hard disk drive by placing a memory in between the hard disk drive, processor, and decoder to have the data stored and played back.

Another aspect of the present invention features a digital video recorder.

The digital video recorder in accordance with an embodiment of the present invention has a storage unit, which includes a volatile memory, a non-volatile memory, and a hard disk drive, and a memory controller, which controls audio and video streams successively outputted from a demultiplexer to be moved to and stored in the volatile memory, the non-volatile memory, and the hard disk drive in the order of the volatile memory, non-volatile memory, and hard disk drive.

A storage area of the volatile memory can be partitioned into a plurality of VM areas; each VM area can successively store audio and video streams by a designated size; and audio and video streams stored in a VM area, the storage space of which is completely used up, can be moved or copied to the non-volatile memory by the memory controller.

A storage area of the non-volatile memory can be allotted into a plurality of partitioned areas including a buffering area and an NV storage area; audio and video streams stored in the VM area can be stored in the NV storage area; and audio and video streams stored in an NV storage area, the storage space of which is completely used up, can be moved or copied to the hard disk drive by the memory controller.

If the storage space of the NV storage area is completely used up, the memory controller can control the audio and video streams stored in the VM area to be stored in the buffering area while the audio and video streams are moved or copied to the hard disk drive.

If the moving or copying of the audio and video streams written in the NV storage area is completed, the size of the buffering area can be expanded by the size of the NV storage area; the expanded buffering area can be re-designated as a new NV storage area; and a reduced NV storage area can be re-designated as a new buffering area.

The stream data stored in the storage unit can be a PS (program stream) or a partial TS (transport stream).

The digital video recorder in accordance with another embodiment of the present invention can include a storage unit, which includes a volatile memory, a non-volatile memory, and a hard disk drive, and a memory controller, which controls stream data stored in the hard disk drive to be moved or copied to the volatile memory or the non-volatile memory. A decoder can decode and output stream data stored in the volatile memory or the non-volatile memory.

The memory controller can move or copy stream data in the size that can be decoded and played back by the decoder to the volatile memory, while stream data are moved or copied to the non-volatile memory.

Stream data, following the stream data written in the volatile memory, can be written in the non-volatile memory.

If decoding the stream data written in the volatile memory is completed, the decoder can successively decode and output stream data stored in the non-volatile memory.

The stream data can be a PS (program stream) or a partial TS (transport stream).

Another aspect of the present invention features a method for storing and/or playing back stream data of a digital video recorder.

The method for storing stream data of a digital video recorder in accordance with an embodiment of the present invention can include (a) moving and storing audio and video streams, which are successively outputted from a demultiplexer, in a non-volatile memory if the audio and video streams are accumulated in a volatile memory as stream data in a predetermined size and (b) if stream data in a predetermined size are accumulated in the non-volatile memory by repeating the above step (a), or accumulation of stream data of a corresponding broadcast program is completed, moving and storing the stream data in a hard disk drive.

If a storage area of the volatile memory is divided into a first partitioned area and a second partitioned area, the step (a) can include i) starting an accumulation of stream data in the first partitioned area, ii) if the storage space of the first partitioned area is completely used up, controlling the accumulated stream data to be moved to and stored in the non-volatile memory and controlling stream data for succeeding audio and video streams to be accumulated in the second partitioned area, and iii) if the storage space of the second partitioned area is completed used up, controlling the accumulated stream data to be moved to and stored in the non-volatile memory and controlling stream data for succeeding audio and video streams to be accumulated in the first partitioned area.

If a storage area of the non-volatile memory is divided into a buffering area and an NV storage area, the step (b) can include i) starting an accumulation of the stream data in the NV storage area, and ii) if the storage space of the NV storage area is completely used up, controlling the accumulated stream data to be moved to and stored in the hard disk drive and controlling succeeding stream data to be accumulated in the buffering area. Once the moving of the stream data accumulated in the NV storage area is completed, the buffering area can be expanded by the storage space of the NV storage area and be re-designated as a new NV storage area, and the remaining storage space can be re-designated as a new buffering area.

The buffering area can have storage space that is sufficient to accumulate succeeding stream data while the stream data accumulated in the NV storage area are being moved and stored in the hard disk drive.

The method for playing back stream data of a digital video recorder in accordance with another embodiment of the present invention can include i) having a certain size of stream data with an earlier playback order stored in a volatile memory, the stream data with an earlier playback order being among stream data stored in a hard disk, and ii) having stream data following the stream data, which are stored in the volatile memory, stored in a non-volatile memory. The size of the stream data stored in the volatile memory can be large enough to be played back while the succeeding stream data are stored in the non-volatile memory.

A decoder can control the succeeding stream data stored in the non-volatile memory to be decoded, once decoding of the stream data stored in the volatile memory is completed.

The stream data can be a PS (program stream) or a partial TS (transport stream).

Still another aspect of the present invention features a recorded medium recording a method for storing and/or playing back stream data of a digital video recorder.

According to an embodiment of the present invention, the recorded medium tangibly embodies a program of instructions executable by a digital video recorder to execute a method for storing stream data. The program, which is readable by the digital video recorder, can execute (a) moving and storing audio and video streams, which are successively outputted from a demultiplexer, in a non-volatile memory if the audio and video streams are accumulated in a volatile memory as stream data in a predetermined size, and (b) if stream data in a predetermined size are accumulated in the non-volatile memory by repeating the above step (a), or accumulation of stream data of a corresponding broadcast program is completed, moving and storing the stream data in a hard disk drive.

If a storage area of the volatile memory is divided into a first partitioned area and a second partitioned area, the step (a) can include i) starting an accumulation of stream data in the first partitioned area, ii) if the storage space of the first partitioned area is completely used up, controlling the accumulated stream data to be moved to and stored in the non-volatile memory and controlling stream data for succeeding audio and video streams to be accumulated in the second partitioned area, and iii) if the storage space of the second partitioned area is completed used up, controlling the accumulated stream data to be moved to and stored in the non-volatile memory and controlling stream data for succeeding audio and video streams to be accumulated in the first partitioned area.

If a storage area of the non-volatile memory is divided into a buffering area and an NV storage area, the step (b) can include i) starting an accumulation of the stream data in the NV storage area, and ii) if the storage space of the NV storage area is completely used up, controlling the accumulated stream data to be moved to and stored in the hard disk drive and controlling succeeding stream data to be accumulated in the buffering area. Once the moving of the stream data accumulated in the NV storage area is completed, the buffering area can be expanded by the storage space of the NV storage area and can be re-designated as a new NV storage area, and the remaining storage space can be re-designated as a new buffering area.

According to another embodiment of the present invention, the recorded medium tangibly embodies a program of instructions executable by a digital video recorder to execute a method for playing back stream data. The program, which is readable by the digital video recorder, can execute i) having a certain size of stream data with an earlier playback order stored in a volatile memory, the stream data with an earlier playback order being among stream data stored in a hard disk, and ii) having stream data following the stream data, which are stored in the volatile memory, stored in a non-volatile memory. The size of the stream data stored in the volatile memory can be large enough to be played back while the succeeding stream data are stored in the non-volatile memory.

DESCRIPTION OF CERTAIN INVENTIVE EMBODIMENTS

Figure 1:
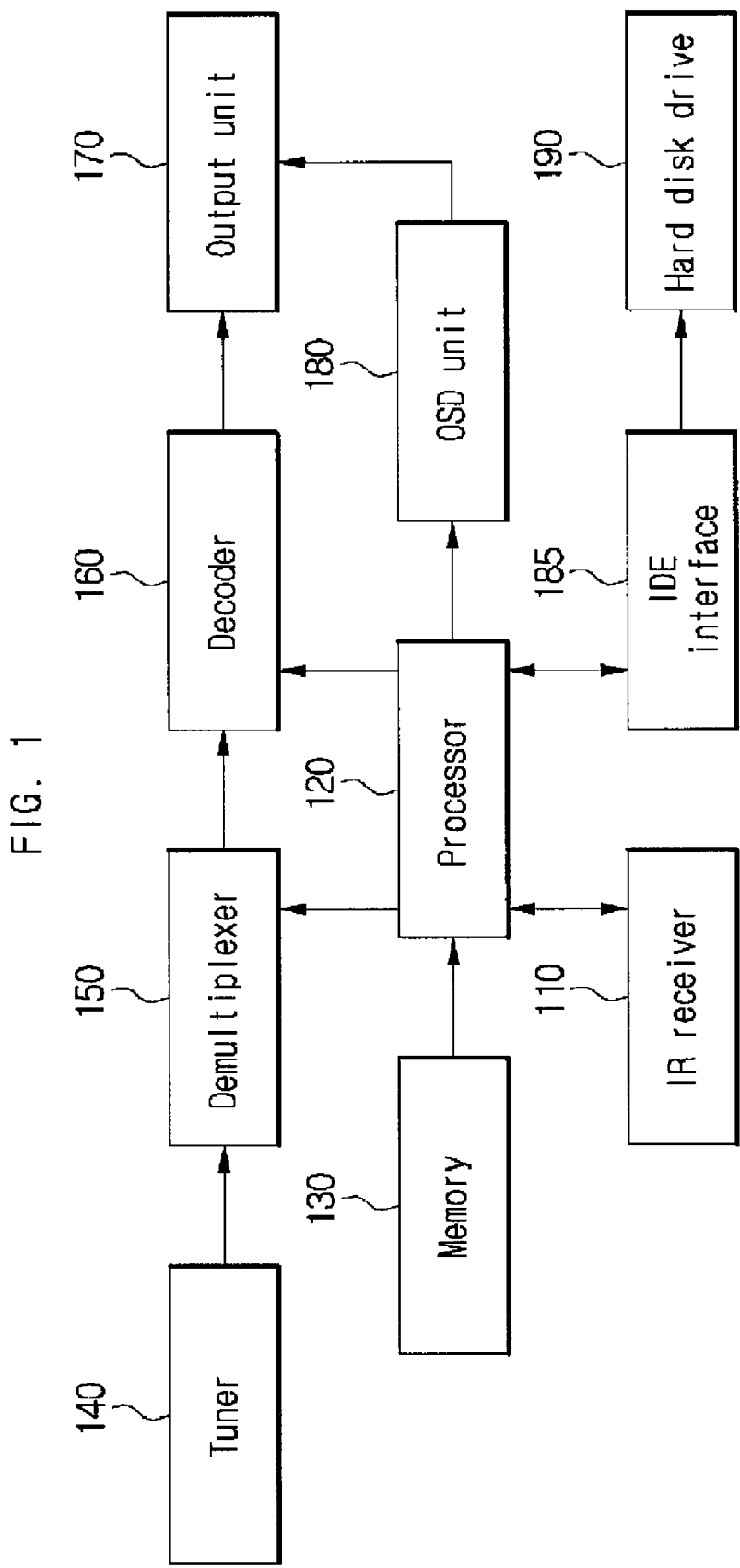
FIG. 1 shows a block diagram of conventional PVR system.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments will be described in detail with reference to the accompanying drawings. Identical or corresponding elements will be given the same reference numerals, regardless of the figure number, and any redundant description of the identical or corresponding elements will not be repeated.

Figure 2:
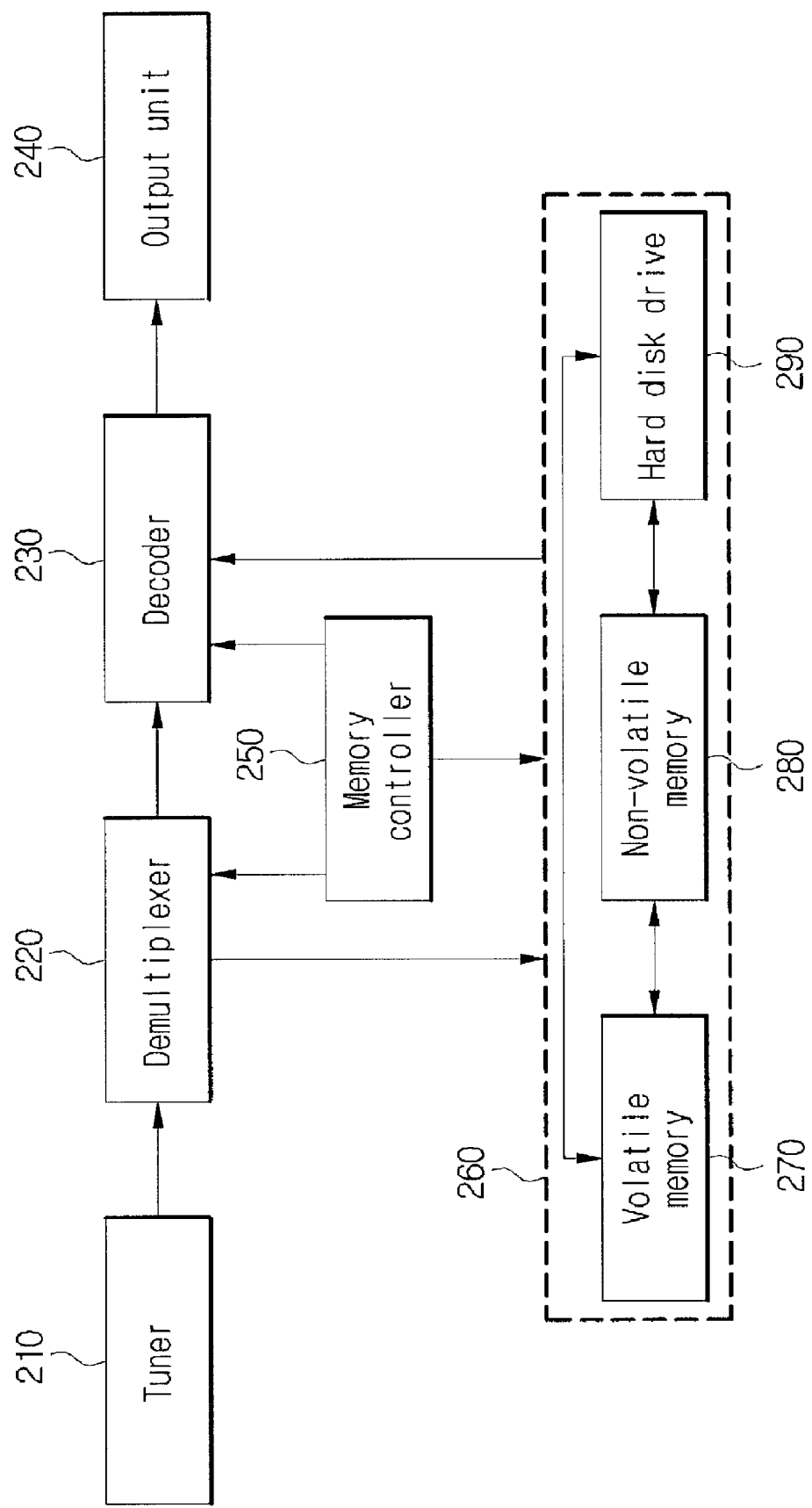
FIG. 2 shows a block diagram of a digital video recorder in accordance with an embodiment of the present invention.
Figure 3:
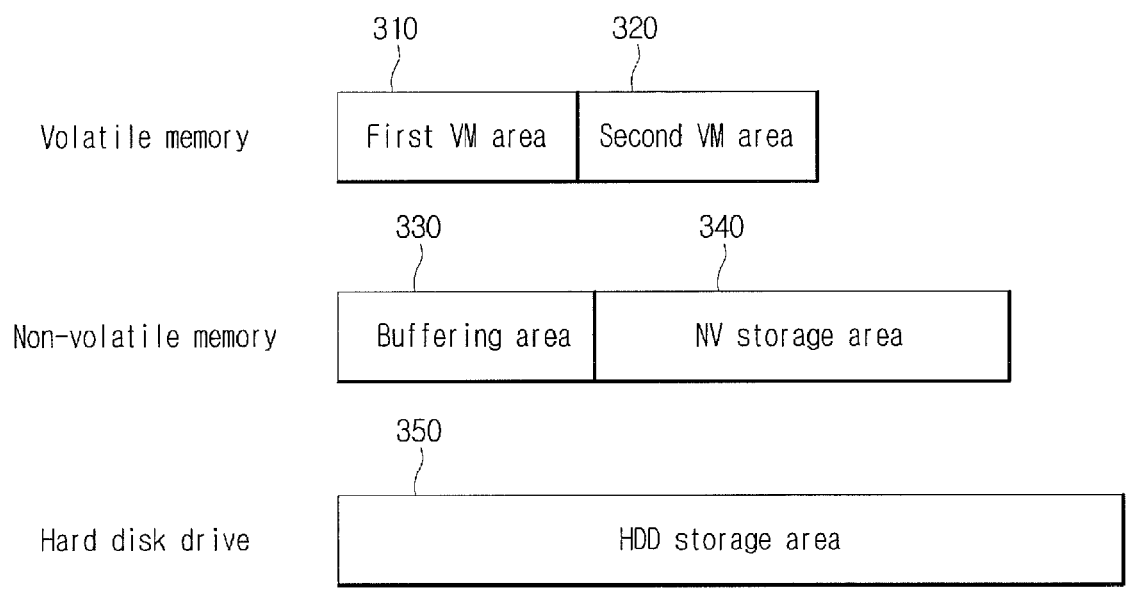
FIG. 3 illustrates a hierarchical memory structure in accordance with an embodiment of the present invention.

FIG. 2 is a block diagram showing a digital video recorder in accordance with an embodiment of the present invention, and FIG. 3 is illustration of a hierarchical memory structure in accordance with an embodiment of the present invention.

Referring to FIG. 2, the digital video recorder in accordance with an embodiment of the present invention includes a tuner 210, a demultiplexer 220, a decoder 230, an output unit 240, a memory controller 250, and a storage unit 260. The storage unit 260 can include a volatile memory 270, a non-volatile memory, and a hard disk drive 290.

The tuner 210 receives and outputs a broadcast signal, selected by the control of a playback processor (not shown). The playback processor can be a main processor that controls the operation of the digital video recorder.

The demultiplexer 220 demultiplexes various kinds of information, such as audio, video, and other data that are multiplexed in broadcast signals supplied by the tuner 210. The demultiplexer 220 also demultiplexes a broadcast program, selected in accordance with the user's selection input, among broadcast signals received through the tuner 210 and extracts the selected broadcast program to video and audio streams. The broadcast signal extracted and outputted by the demultiplexer 220 can be an MPEG data format, for example, program stream (PS) and/or partial transport stream (TS).

The decoder 230 decodes the audio and video streams, parsed by the demultiplexer 220, and processes the decoded audio and video streams to visual information and audio information that can be outputted through the output unit 240 such that the user can recognize the information.

The output unit 240 outputs the decoded audio and video signals, outputted from the decoder 230, to video and/or audio information. The output unit 240 can include a display and/or a speaker.

The memory controller 250 designates the storage means to which the video and audio streams outputted from the demultiplexer 220 are to be stored and has the pertinent video and audio streams stored in accordance with the hierarchical structure of a plurality of storage means. The memory controller 250 also controls the stored data to be read and to be outputted through the output unit 240 in accordance with the hierarchical structure of the storage means.

The storage unit 260 includes a volatile memory 270, non-volatile memory 280, and a hard disk drive 290. The video and audio streams that are stored in the storage means can be a form of PS and/or partial TS.

Although freely readable and writeable and fast to operate, the volatile memory 270 loses the stored data once the power is cut off. The volatile memory 270 can be a RAM, for example. As illustrated in FIG. 3, the volatile memory 270 can be logically partitioned into a plurality of areas. For example, the volatile memory can be partitioned into a first VM (volatile memory) area 310 and a second VM area 320, if the volatile memory 270 is divided into 2 areas.

The non-volatile memory 280 is slower than the memory although it is possible to read/write in block units. The non-volatile memory 280 can be, for example, a flash memory. As shown in FIG. 3, the non-volatile memory 280 can be logically partitioned into a plurality of areas. For example, the non-volatile memory can be partitioned into a buffering area 330 and an NV (non-volatile) storage area 340.

Although the hard disk drive 290 can store and maintain a large capacity of data, it is slow and noisy.

The present invention maximizes the positive features and minimizes the negative features of the storage means to apply the hierarchical structure between the storage means. In other words, the memory controller 250 controls each of the storage means in the storage unit 260 as a hierarchical structure (i.e., data flow) of the volatile memory 270—non-volatile memory 280—hard disk drive 290, if the video and audio streams outputted from the demultiplexer 220 are stored in the storage means. On the other hand, the memory controller 250 controls the storage means as a hierarchical structure of the hard disk drive 290—non-volatile memory 280—volatile memory 270 or a hierarchical structure of the hard disk drive 290—volatile memory 270—non-volatile memory 280 if the data stored in each of the storage means are played back.

Figure 4:
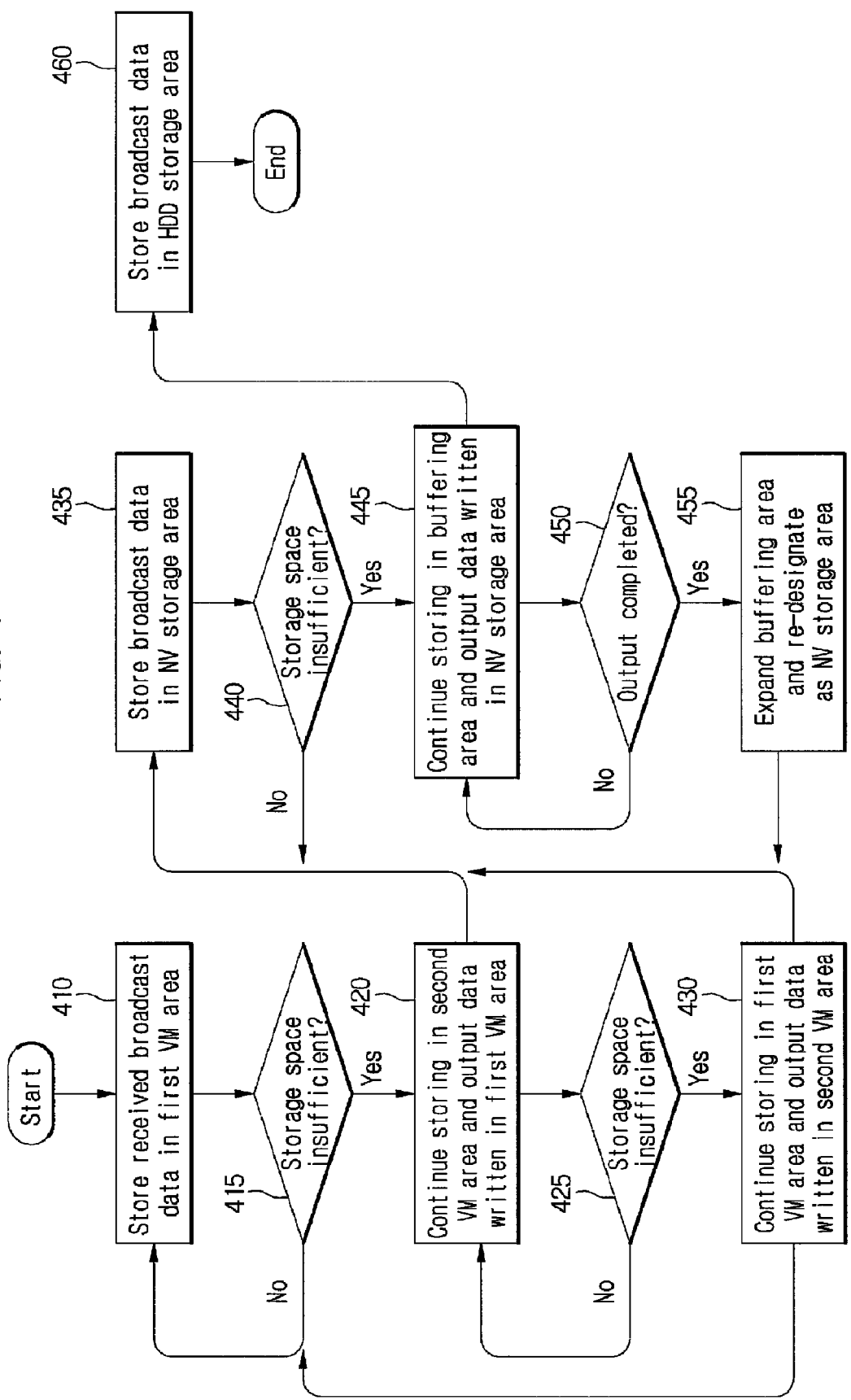
FIG. 4 shows a flow chart of a method for hierarchically operating storage means when writing data in accordance with an embodiment of the present invention.
Figure 5:
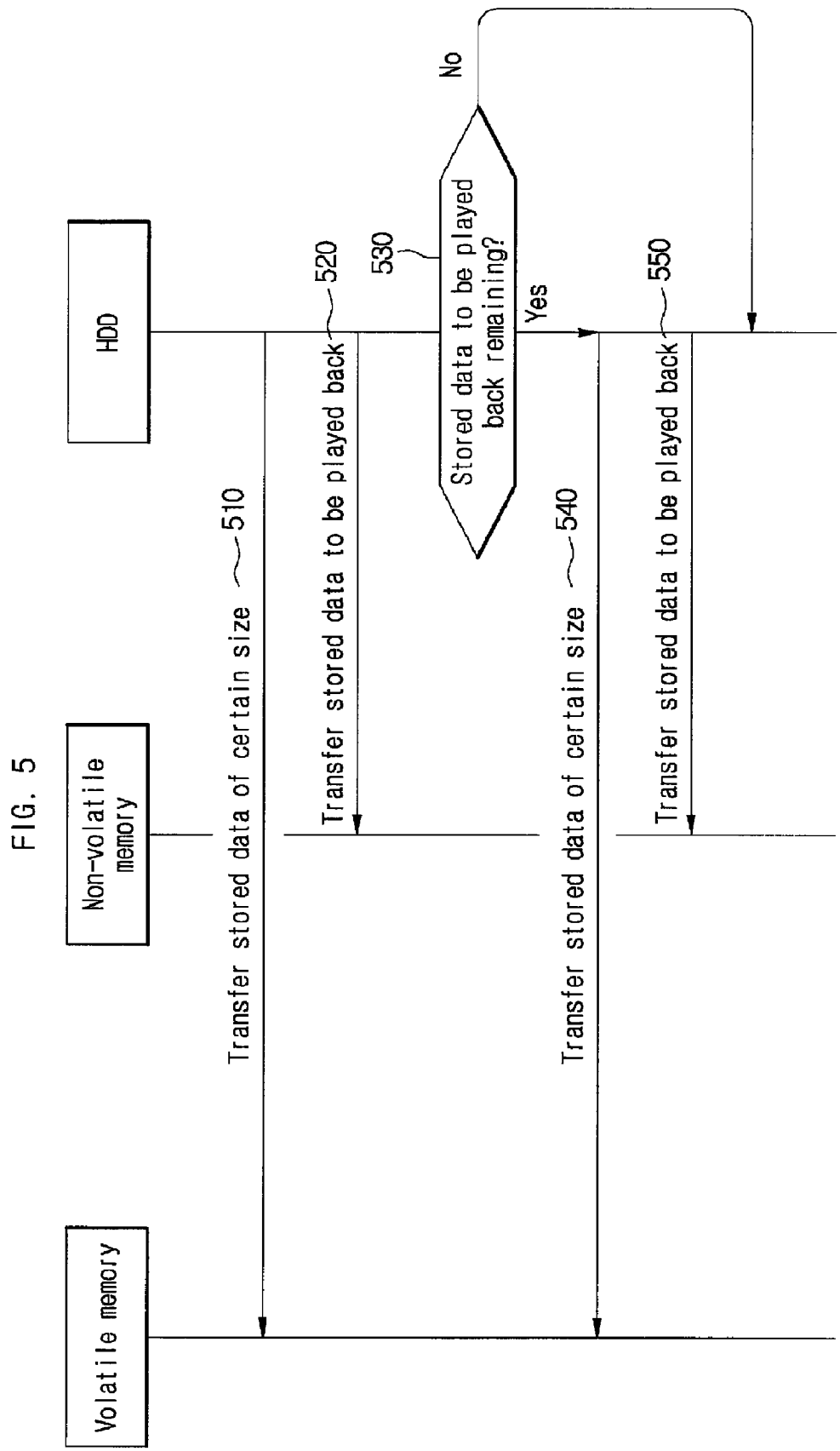
FIG. 5 shows a flow chart of a method for hierarchically operating storage means when playing back data in accordance with an embodiment of the present invention.

FIGS. 3 to 5 will be referenced below to describe how the storage means of the digital video recorder are operated hierarchically in accordance with the present invention.

FIG. 4 is a flow chart showing how the storage means are operated hierarchically, when data is written, in accordance with an embodiment of the present invention.

Referring to FIG. 4, in a step represented by 410, the memory controller 250 stores the audio and video streams, outputted from the demultiplexer 220 in accordance with the user's command to store broadcast data, in the first VM area 310 of the volatile memory 270.

In step 415, the memory controller 250 determines whether the storage space of the first VM area 310 is used up while storing the audio and video streams, successively outputted from the demultiplexer 220, in the first VM area 310 of the volatile memory 270.

If there still is storage space in the first VM area 310, step 410 is repeated to continuously store the audio and video streams, outputted from the demultiplexer 220, in the first VM area 310 of the volatile memory 270.

If the storage space of the first VM area 310 is used up, however, step 420 is performed to have the memory controller 250 store following audio and video streams in the second VM area 320. The memory controller 250 also controls the data stored in the first VM area 310 to be written in the NV storage area 340 of the non-volatile memory 280, in steps represented by 420 and 435.

As described above, the storage space of the volatile memory 270 is divided into two or more partitioned areas, and if the audio and video streams fill up the storage space of one of the partitioned areas, succeeding audio and video streams will continue to be stored in another partitioned area. While the audio and video streams are stored in another partitioned area, the data written in the partitioned area, in which the preceding audio and video streams are stored, are stored in the NV storage area 340 of the non-volatile memory 280, and once the storing is completed, the data written in the pertinent partitioned area is deleted. For example, if the volatile memory 270 consists of and sequentially use the first VM area 310 and the second VM area 320, as shown in FIG. 3, the data written in the first VM area 310 is written in the NV storage area 340 of the non-volatile memory 280 while the audio and video streams are stored in the second VM area 320. However, all of the data written in the first VM area 310 will have to move to or be copied to the NV storage area 340 of the non-volatile memory 280 before completing the writing of the audio and video streams in the second VM area 320. If the writing of the audio and video streams is completed before the storage space of the first VM area 310 is used up, the second VM area 320 will no longer be used, and the audio and video streams written in the first VM area 310 will move to or be copied to the NV storage area 340 by the control of the memory controller 250.

In step 425, the memory controller 250 determines whether the storage space of the second VM area 320 is used up while storing the audio and video streams, successively outputted from the demultiplexer 220, in the second VM area 320 of the volatile memory 270.

If there is remaining storage space in the second VM area 320, step 420 is repeated to have the audio and video streams, outputted from the demultiplexer 220, stored continuously in the second VM area 320 of the volatile memory 270. In this case, especially if the writing of the audio and video streams is completed before the storage space of the second VM area 320 is used up, the first VM area 310 will no longer be used for writing the corresponding audio and video streams, and the audio and video streams written in the second VM area 320 will move to or be copied to the NV storage area 340 by the control of the memory controller 250.

However, if the storage area of the second VM area 320 is used up, the memory controller 250 controls, in step 430, the succeeding audio and video streams to be stored in the first VM area 310. The memory controller 250 also controls the data written in the second VM area 320 to be written in the NV storage area 340 of the non-volatile memory 280, in steps 430 and 435.

In step 435, the memory controller 250 controls the audio and video streams, written in the first VM area 310 or the second VM area 320, to be stored in the NV storage area 340. Here, it is preferable that the size of the NV storage area 340 corresponds to a capacity that can record an episode of a typical broadcast program. The recording capacity of a typical broadcast program may vary depending on the digital broadcast, but an approximate amount of 3.5G bytes is required for a 2-hour program since the DVB SD level has a bit rate of about 4 Mbps. The size of the NV storage area 340 can be adjusted or preconfigured according to the bit rate of the broadcasting environment.

In step 440, the memory controller 250 determines whether the storage space of the NV storage area 340 is used up.

If there remains storage space in the NV storage area 340, step 435 is repeated to have the memory controller 250 control the audio and video streams, received from the first VM area 310 or the second VM area 320, to be continuously stored in the storage space of the NV storage area 340.

If, however, the storage space of the NV storage area 340 is used up, step 445 is performed to have the memory controller 250 control the succeeding audio and video streams to be stored in the buffering area 330. The memory controller also controls the data written in the NV storage area 340 to be stored in a HDD storage area 350 of the hard disk drive 290, in steps 445 and 460.

In step 450, the memory controller 250 determines whether all of the audio and video streams written in the NV storage area 340 are moved to or copied to the hard disk drive 290.

If all of the pertinent audio and video streams are not moved to or copied to the hard disk drive, the step 445 is repeated. If, however, all of the pertinent audio and video streams are moved to or copied to the hard disk drive, step 455 is performed to expand the buffering area 330 (i.e., the partitioned storage area of the non-volatile memory 280 to which the audio and video streams are presently moved from the volatile memory 270) to re-designate it as the NV storage area 340 and re-designates the remaining area as the buffering area 330. In this case, the size of the buffering area 330 and NV storage area 340 can be maintained constant by expanding the buffering area 330 by the originally-designated size of the NV storage area 340 and re-designating the expanded buffering area 330 as the NV storage area 340. Moreover, it is preferable that the original size of the buffering area 330 be at least large enough to store the audio and video stream, which are moved to or copied from the volatile memory 270, while all of the audio and video streams stored in the NV storage area 340 are moved or copied to the hard disk drive 290.

As described above, the non-volatile memory 280 is logically partitioned into 2 or more storage areas in accordance with the present invention. Therefore, in case the storage space of any one partitioned area is used up, succeeding data can be written in another partitioned area while the data written in the used-up partitioned area are being moved or copied to the hard disk drive 290, thereby guaranteeing the data-sequencing.

As described above, however, if the NV storage area 340 is configured to have a storage capacity that can store all of the audio and video streams corresponding to one broadcast program, the storing of the succeeding audio and video streams in the buffering area 330 will not be performed. Moreover, if the storing of the audio and video streams according to the user's command to store a broadcast program is completed, the pertinent audio and video streams will be moved or copied to the hard disk drive 290. It is possible to determine whether all of the audio and video streams of a broadcast program corresponding to the user's storage command are stored, by using an assigned identifier or broadcast time corresponding to each broadcast program. Since the method of the above determination is well known to anyone skilled in the art, the pertinent description will not be provided herein.

Below, the procedure for playing back the data, written in the hard disk, through the hierarchical operation of the storage means, as described above for writing the data, will be described with reference to FIG. 5.

FIG. 5 is a flow chart showing a method for hierarchically operating storage means when playing back data in accordance with an embodiment of the present invention.

Referring to FIG. 5, in step 510, the memory controller 250 controls the audio and video streams stored in the hard disk drive 290 to have audio and video streams of a certain size moved or copied (collectively referred to as "copied", hereinafter) to the volatile memory (i.e., the first VM area 310 or the second VM area 320). The subject of copying the pertinent audio and video streams can be the memory controller 250. The playback controller or the memory controller 250 also controls the decoder 230 to decode the audio and video data stored in the volatile memory 270 and output the decoded audio and video data through the output unit 240. The minimum size of the audio and video streams copied to the volatile memory 270 should be sufficient for playing back until audio and video streams to be played back successively are completely copied from the hard disk drive 290 to the NV storage area 340 of the non-volatile memory. The memory controller 250 writes audio and video streams, which will be initially played back, in the volatile memory 270 because the data written in the volatile memory 270 can be processed more quickly. It shall be also evident that the audio and video streams to be played back initially can be copied to the buffering area 330 to have succeeding audio and video streams copied to the NV storage area 340 during the playback.

In step 520, the memory controller 250 copies audio and video streams, which succeed the audio and video stream copied to the volatile memory 270 through the above step 510, from the hard disk drive 290 to the NV storage area 340. Once the playing back using the data stored in the volatile memory 270 is completed, the playback controller or the memory controller 250 controls the decoder 230 to decode the audio and video streams written in the NV storage area 340 of the non-volatile memory 280 and output the decoded audio and video data through the output unit 240.

In step 530, the memory controller 250 determines whether there remain audio and video streams to be successively played back in accordance with the broadcast program, which is presently played back, in the hard disk drive 290. The step 530 can be performed any time while playing back the audio and video streams that are copied to the NV storage area 340. However, since there can be audio and video streams to be successively played back, it would be preferable that the step 530 be performed prior to the time required to have some or all of the pertinent data copied in the volatile memory 270 or the buffering area 330.

This can be determined by using the time required for the memory controller 250 or a digital video recorder to copy data written in particular storage means to other storage means (which can be calculated using the bit rate and the amount of data to transfer) and the time required for playing back using the data written in particular storage means (which can be calculated using the bit rate and the amount of data to play back).

The step 530 and following steps can be omitted if the size of the storage space of the NV storage area 340 is configured to a capacity that can store one broadcast program or if audio and video streams to be successively played back are not present in the hard disk drive 290.

If, however, the audio and video streams to be successively played back are present in the hard disk drive 290, the memory controller 250 controls, in step 540, the audio and video streams of a certain size, which follow the audio and video streams stored in the hard disk drive 290 that are copied to the NV storage area 340, to be copied to the volatile memory 270. The audio and video streams copied through the step 540 will be used for playback after the audio and video streams copied to the NV storage area 340 through the step 520 are completely played back. As described above, the pertinent audio and video streams can be copied to the buffering area 330. The step 540 is performed for the same reason as the step 510.

In step 550, the memory controller 250 controls audio and video streams that follow the audio and video streams written in the volatile memory 270 in the step 540 to be copied to the NV storage area 340 of the non-volatile memory 280. The step 550 can be omitted if the audio and video streams written in the volatile memory 270 or the buffering area 330 through the step 540 are the final audio and video streams for the corresponding broadcast program.

As described above, the digital video recorder of the present invention copies a certain amount of data, for the audio and video streams written in the hard disk drive 290, to the volatile memory 270 or the non-volatile memory 280 and plays back the audio and video streams by using the copied data, rather than playing back the data from the hard disk drive 290, when playing back the audio and video streams written in the hard disk drive 290.

Therefore, by operating the storage means hierarchically, the digital video recorder in accordance with the present invention can minimize the time required for storing the data and the stand-by time required for playing back the data, when writing the data in the storage unit 260 or performing the playback by using the data written in the storage unit 260. Furthermore, by allowing the hard disk drive 290 to be used only when all of the data stored in the non-volatile memory 280 are transferred to the hard disk drive 290 during the storing of the data or when all of the data stored in the hard disk drive 290 are transferred to the volatile memory 270 or the non-volatile memory 280 during the playback of the data, the use of the hard disk drive 290 can be minimized over the conventional data storage and playback methods.

Although certain embodiments of the present invention have been described, anyone of ordinary skill in the art to which the invention pertains should be able to understand that a very large number of permutations are possible without departing the spirit and scope of the present invention, which shall only be defined by the claims appended below.

What is claimed is:

1. A digital video recorder, comprising:
 a storage unit that includes a volatile memory, a non-volatile memory, and a hard disk drive; and
 a memory controller to control audio and video streams successively outputted from a demultiplexer to be moved to and stored in the volatile memory,
 wherein the memory controller controls the audio and video streams to be moved to and stored in the non-volatile memory when a first predetermined size of stream data in the audio and video streams are accumulated in the volatile memory, and
 the memory controller controls the audio and video streams to be moved to and stored in the hard disk drive when a second predetermined size of stream data in the audio and video streams are accumulated in the non-volatile memory, or an accumulation of stream data of a corresponding broadcast program is completed.

2. The digital video recorder of claim 1, wherein a storage area of the volatile memory is partitioned into a plurality of volatile memory (VM) areas;
 each VM area successively stores audio and video streams by a designated size; and
 audio and video streams stored in a VM area, the storage space of which is completely used up, are moved or copied to the non-volatile memory by the memory controller.

3. The digital video recorder of claim 2, wherein a storage area of the non-volatile memory is allotted into a plurality of partitioned areas including a buffering area and a non-volatile (NV) storage area;
 audio and video streams stored in the VM area are stored in the NV storage area; and
 audio and video streams stored in an NV storage area, the storage space of which is completely used up, are moved or copied to the hard disk drive by the memory controller.

4. The digital video recorder of claim 3, wherein when the storage space of the NV storage area is completely used up, the memory controller controls the audio and video streams stored in the VM area to be stored in the buffering area while the audio and video streams are moved or copied to the hard disk drive.

5. The digital video recorder of claim 4, wherein when the moving or copying of the audio and video streams written in the NV storage area is completed, a size of the buffering area is expanded by a size of the NV storage area, the expanded buffering area is re-designated as a new NV storage area, and a reduced NV storage area is re-designated as a new buffering area.

6. The digital video recorder of claim 1, wherein stream data stored in the storage unit is a PS (program stream) or a partial TS (transport stream).

7. A digital video recorder, comprising:
 a storage unit that includes a volatile memory, a non-volatile memory, and a hard disk drive; and
 a memory controller to control stream data with an earlier playback order being among stream data stored in the hard disk drive to be moved or copied to the volatile memory,
 wherein the memory controller controls stream data following the stream data stored in the volatile memory, to be moved or copied to the non-volatile memory, and
 a size of the stream data stored in the volatile memory is large enough to be played back while the succeeding stream data are stored in the non-volatile memory.

8. The digital video recorder of claim 7, wherein the stream data, following the stream data written in the volatile memory, are written in the non-volatile memory.

9. The digital video recorder of claim 8, wherein when decoding the stream data written in the volatile memory is completed, a decoder successively decodes and outputs stream data stored in the non-volatile memory.

10. The digital video recorder of claim 7, wherein the stream data is a PS (program stream) or a partial TS (transport stream).

11. A method for storing stream data of a digital video recorder, comprising:
 (a) moving and storing audio and video streams, which are successively outputted from a demultiplexer, in a non-volatile memory when a predetermined size of stream data in the audio and video streams are accumulated in a volatile memory; and
 (b) when a predetermined size of stream data in the audio and video streams are accumulated in the non-volatile memory by repeating the moving and storing of the audio and video streams in the non-volatile memory, or an accumulation of stream data of a corresponding broadcast program is completed, moving and storing the stream data in a hard disk drive.

12. The method of claim 11, wherein when a storage area of the volatile memory is divided into a first partitioned area and a second partitioned area, the moving and storing audio and video streams in the non-volatile memory comprises:
   starting an accumulation of stream data in the first partitioned area;
   when the storage space of the first partitioned area is completely used up, controlling the accumulated stream data to be moved to and stored in the non-volatile memory and controlling stream data for succeeding audio and video streams to be accumulated in the second partitioned area; and
   when the storage space of the second partitioned area is completed used up, controlling the accumulated stream data to be moved to and stored in the non-volatile memory and controlling stream data for succeeding audio and video streams to be accumulated in the first partitioned area.

13. The method of claim 11, wherein when a storage area of the non-volatile memory is divided into a buffering area and a non-volatile (NV) storage area, the moving and the storing the stream data in the hard disk drive comprises:
   starting an accumulation of the stream data in the NV storage area; and
   when the storage space of the NV storage area is completely used up, controlling the accumulated stream data to be moved to and stored in the hard disk drive and controlling succeeding stream data to be accumulated in the buffering area,
   whereas, once the moving of the stream data accumulated in the NV storage area is completed, the buffering area is expanded by the storage space of the NV storage area and is re-designated as a new NV storage area, and the remaining storage space is re-designated as a new buffering area.

14. The method of claim 13, wherein the buffering area has storage space sufficient to accumulate succeeding stream data while the stream data accumulated in the NV storage area are being moved and stored in the hard disk drive.

15. A method for playing back stream data of a digital video recorder, comprising:
   having a certain size of stream data with an earlier playback order stored in a volatile memory, the stream data with an earlier playback order being among stream data stored in a hard disk; and
   having stream data following the stream data, which are stored in the volatile memory, stored in a non-volatile memory;
   whereas a size of the stream data stored in the volatile memory is large enough to be played back while the succeeding stream data are stored in the non-volatile memory.

16. The method of claim 15, wherein a decoder controls the succeeding stream data stored in the non-volatile memory to be decoded, once decoding of the stream data stored in the volatile memory is completed.

17. The method of claim 15, wherein the stream data is a PS (program stream) or a partial TS (transport stream).

* * * * *